US009035803B2

(12) United States Patent
Cleveland

(10) Patent No.: US 9,035,803 B2
(45) Date of Patent: May 19, 2015

(54) SYSTEMS AND METHODS FOR AIDING TRAFFIC CONTROLLERS AND/OR PILOTS

(75) Inventor: Dixon Cleveland, Annandale, VA (US)

(73) Assignee: LC Technologies, Inc., Fairfax, VA (US)

( * ) Notice: Subject to any disclaimer, the term of this patent is extended or adjusted under 35 U.S.C. 154(b) by 428 days.

(21) Appl. No.: 13/196,602

(22) Filed: Aug. 2, 2011

(65) Prior Publication Data
US 2012/0032817 A1    Feb. 9, 2012

Related U.S. Application Data

(60) Provisional application No. 61/370,266, filed on Aug. 3, 2010.

(51) Int. Cl.
*G01C 21/00*    (2006.01)
*G01C 23/00*    (2006.01)
*G06F 3/01*    (2006.01)
*G02B 27/00*    (2006.01)

(52) U.S. Cl.
CPC ............ *G06F 3/013* (2013.01); *G02B 27/0093* (2013.01)

(58) Field of Classification Search
USPC .......... 340/971, 903, 933, 937, 435; 701/300, 701/301, 302
See application file for complete search history.

(56) References Cited

U.S. PATENT DOCUMENTS

| 2010/0253526 | A1* | 10/2010 | Szczerba et al. | 340/576 |
| 2011/0228051 | A1* | 9/2011 | Dedeoglu et al. | 348/46 |
| 2012/0271484 | A1* | 10/2012 | Feit et al. | 701/1 |

FOREIGN PATENT DOCUMENTS

WO    WO 9849028 A1 * 11/1998

* cited by examiner

*Primary Examiner* — George Bugg
*Assistant Examiner* — Anthony D Afrifa-Kyei
(74) *Attorney, Agent, or Firm* — John R. Kasha; Kelly L. Kasha; Kasha Law LLC

(57) ABSTRACT

Gaze based systems and methods are used to aid traffic controllers and/or pilots. A gaze line of an eye of the user viewing the display is tracked using an eyetracker. An intersection of the gaze line of the eye with the display is calculated to provide continuous feedback as to where on the display the user is looking. A trace of the gaze line of the eye is correlated with elements of a situation. The user's awareness of the situation is inferred by verifying that the user has looked at the elements of the situation. In an embodiment, the user is notified of the situation when it is determined that the user has not looked at the elements of the situation for a predetermined period of time. The notification is automatically removed once it is determined that the user has looked at the elements of the situation.

27 Claims, 5 Drawing Sheets

SYSTEMS AND METHODS FOR AIDING TRAFFIC CONTROLLERS AND/OR PILOTS

CROSS-REFERENCE TO RELATED APPLICATION

This application claims the benefit of U.S. Provisional Patent Application No. 61/370,266, filed Aug. 3, 2010, which is incorporated by reference herein in its entirety.

BACKGROUND OF THE INVENTION

1. Field of the Invention

Embodiments of the present invention relate to systems and methods for aiding traffic controllers and/or pilots. More particularly, various embodiments relate to systems and methods that track a gaze line of an eye of the user viewing the display using an eyetracker, calculate an intersection of the gaze line of the eye with the display to provide continuous feedback as to where on the display the user is looking, correlate a trace of the gaze line of the eye with elements of a situation, and infer the user's awareness of the situation by verifying that the user has looked at the elements of the situation.

2. Background Information

In transportation systems, passenger and vehicular safety is the key goal juxtaposed to the operational objective of maximum system efficiency. To achieve the twin goals of safety and efficiency, many transportation systems, such as air, rail, and ship, use human-operated control centers to manage and monitor the traffic flow.

Many computerized collision prediction programs have been developed with the objective of aiding controllers in maintaining adequate vehicle separation and avoiding collisions. These collision prediction programs exploit the untiring rigors of computer automation and have significant potential to identify potential collisions that human controllers may detect too late or even miss altogether.

A key impediment to the successful implementation of these collision avoidance programs within traffic control centers, however, has been a lack of minimally obtrusive means for the programs to communicate with the human controller while he is controlling traffic. Typically, the programs become intrusive "back-seat drivers," warning the controller of many potential conflicts that he/she is already aware of. Given that the controller is typically fully aware of the vast majority of all the potential conflicts, the aggregate costs of his cognitive efforts to cope with warnings about the many situations he is already aware of outweigh the benefits of notifying him about the very few potential conflicts he is not aware of. Thus the potential value of using automated collision prediction programs to minimize rare near-misses and collisions is outweighed by the constant, high cognitive load placed on the controller by having to interact with the program.

BRIEF DESCRIPTION OF THE DRAWINGS

The skilled artisan will understand that the drawings, described below, are for illustration purposes only. The drawings are not intended to limit the scope of the present teachings in any way.

Figure 1:
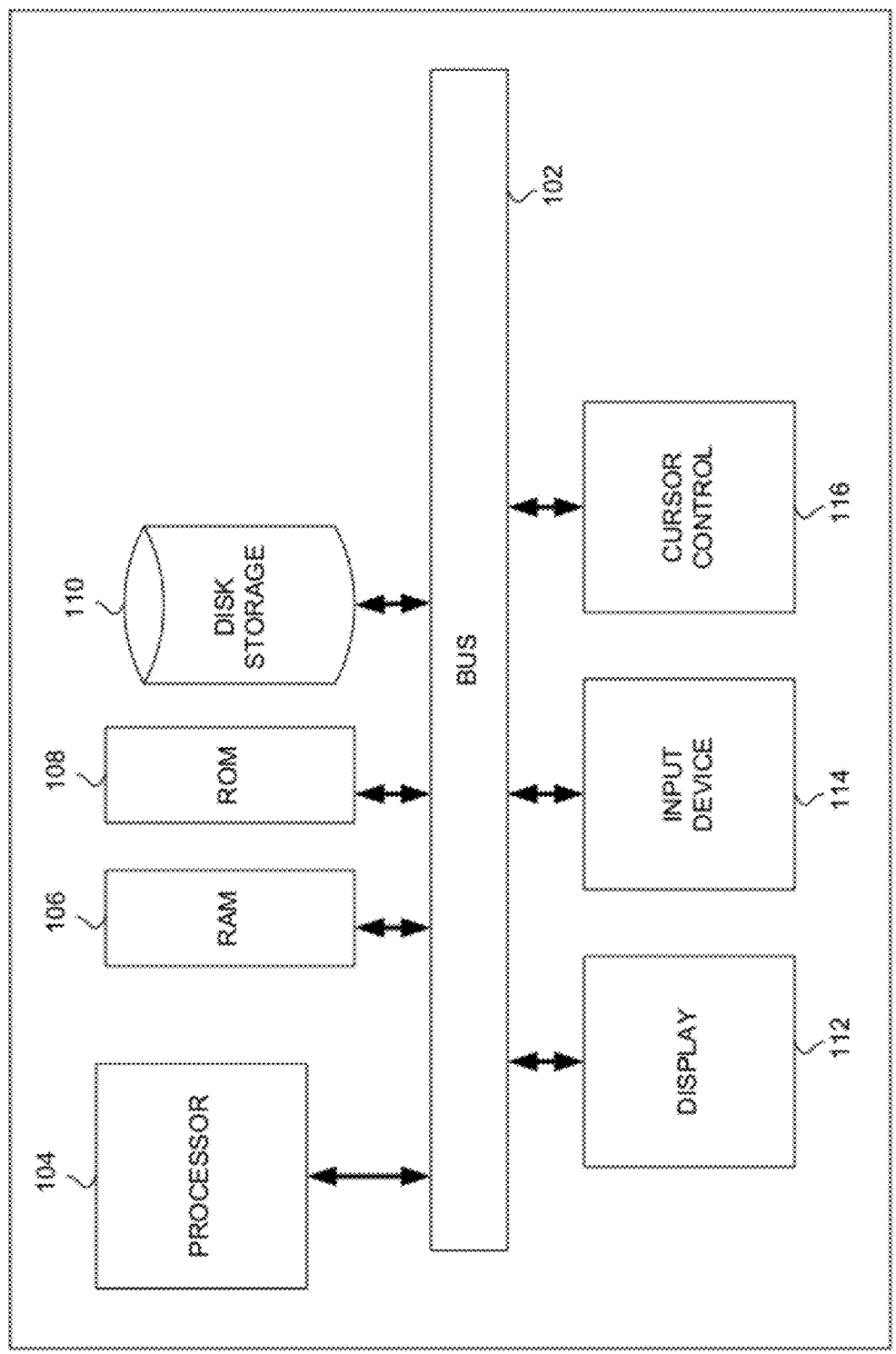
FIG. 1 is a block diagram that illustrates a computer system, in accordance with various embodiments.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, in accordance with various embodiments. Computer system 100 includes a bus 102 or other communication mechanism for communicating information, and a processor 104 coupled with bus 102 for processing information. Computer system 100 also includes a memory 106, which can be a random access memory (RAM) or other dynamic storage device, coupled to bus 102 for determining base calls, and instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), liquid crystal display (LCD), or 3-dimensional display, for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively hard-wired circuitry may be used in place of or in combination with software instructions to implement the present teachings. Thus implementations of the present teachings are not limited to any specific combination of hardware circuitry and software.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media include, for example, a floppy disk, a flexible disk, hard disk, magnetic tape, or any other magnetic medium, a CD-ROM, any other optical medium, punch cards, papertape, any other physical medium with patterns of holes, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a non-transitory and tangible computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Eyetracker

In general, an eyetracker is a device that is used to determine where an eye is looking. Modern eyetrackers, sometimes referred to as video eyetrackers, are camera-based devices that observe a person's eyes and predict the point in space where the person is looking. This point in space is referred to as the gazepoint, for example. The line connecting the fovea of the eye, the center of the eye pupil, and the gazepoint is referred to as the gaze line, for example.

Figure 2:
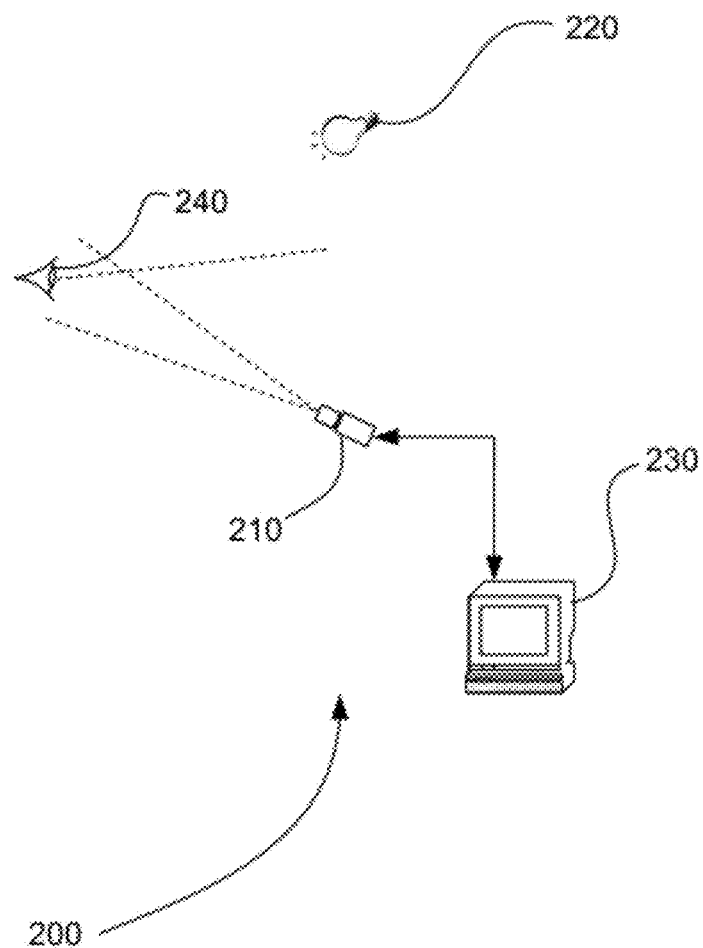
FIG. 2 is a schematic diagram showing an eyetracker, in accordance with various embodiments.

FIG. 2 is a schematic diagram showing an eyetracker 200, in accordance with various embodiments. Eyetracker 200 includes camera 210, illumination source 220, and processor 230. Illumination source 220 illuminates eye 240, and camera 210 images eye 240. Processor 230 receives the image from camera 210 and determines the position of eye 240 from the image. Eyetracker 200 can include additional elements. For example, eyetracker 200 can include one or more additional cameras (not shown) or one or more additional optical devices (not shown) to determine the range from camera 210 to eye 240. Eyetracker 200 can also include a display (not shown) to determine the gazepoint in an image displayed by processor 230 on the display.

Systems and Methods of Data Processing

Embodiments of systems and methods for aiding traffic controllers are described in this detailed description of the invention. In this detailed description, for purposes of explanation, numerous specific details are set forth to provide a thorough understanding of embodiments of the present invention. One skilled in the art will appreciate, however, that embodiments of the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of embodiments of the present invention.

As described above, the potential value of using automated collision prediction programs to minimize rare near-misses and collisions can be outweighed by the constant, high cognitive load placed on the controller by having to interact with the program. In other words, automated collision prediction programs can overwhelm a controller with false positive notifications. Such false positive notifications, in turn, reduce the value of the automated collision prediction programs.

In various embodiments, false positive notifications are prevented in automated collision prediction programs using an eyetracker or an eyegaze system. This eyegaze system includes, for example, a video camera, a computer screen, and a computer or processor. The video camera passively observes a traffic controller's eyes as the traffic controller interacts with a traffic scene displayed on the computer screen. Based on the camera's video image of the traffic controller's eyes, the eyegaze system provides continuous feedback to the processor as to where on the screen the traffic controller is looking. The processor correlates the traffic controller's gazepoint trace with the various vehicles in the traffic scene. The processor can infer the traffic controller's awareness of a possible vehicle collision between two vehicles by verifying that the traffic controller has looked at both vehicles in succession or within a given time interval.

In various embodiments, a traffic controller can include a pilot, driver, or ship's crewman. For example, modern air traffic control systems are offloading a portion of traffic control to pilots. Essentially, in such systems pilots are responsible for controlling the airspace in the area around their aircraft while the aircraft is in flight.

As described above, a key impediment to the successful implementation of automated collision avoidance programs within traffic control centers has been a lack of minimally obtrusive means for the programs to communicate with the human controller while he is controlling traffic. Typically, the programs become intrusive, warning the controller of many potential conflicts that he/she is already aware of.

To make interactive collision avoidance programs operationally effective with human controllers, the number of unnecessary warnings to the controller must be reduced significantly. A non-intrusive method is needed to infer whether or not a controller or pilot (in the even that a pilot is provided more control) is aware of a potential collision and thus whether or not he should be explicitly warned about it.

In various embodiments, a traffic controller or pilot's gazepoint is tracked in real time as he scans his display. The eyetracker or gazepoint tracker unobtrusively monitors the trace of the traffic controller or pilot's point of visual attention as he scans the various vehicles and their paths. As the collision prediction program detects possible conflicts, a "situation awareness" function in the program infers whether the traffic controller or pilot is aware of the given situation by monitoring whether the traffic controller or pilot has visually looked at both vehicles involved in the potential collisions. If the traffic controller or pilot fixates on both vehicles with a gaze trace that demonstrates an awareness of the two vehicle's interaction, the program infers that the traffic controller or pilot is aware of the situation and does not notify him about it. On the other hand, if the program predicts an increased potential for a collision and significant time passes without the traffic controller or pilot visually visiting and re-visiting the situation, the program eventually does notify the traffic controller or pilot. With this gaze-monitoring approach to situation awareness, the collision avoidance program minimizes the number of un-necessary notifications regarding situations the user is aware of, while still issuing potentially useful notifications regarding situations the user is likely not aware of.

Notification of potential conflicts may take the form of highlighting the two vehicles involved, drawing arrows to their potential collision point. The highlight may automatically disappear as soon as the traffic controller or pilot looks at the two vehicles and their projected collision point.

Figure 3:
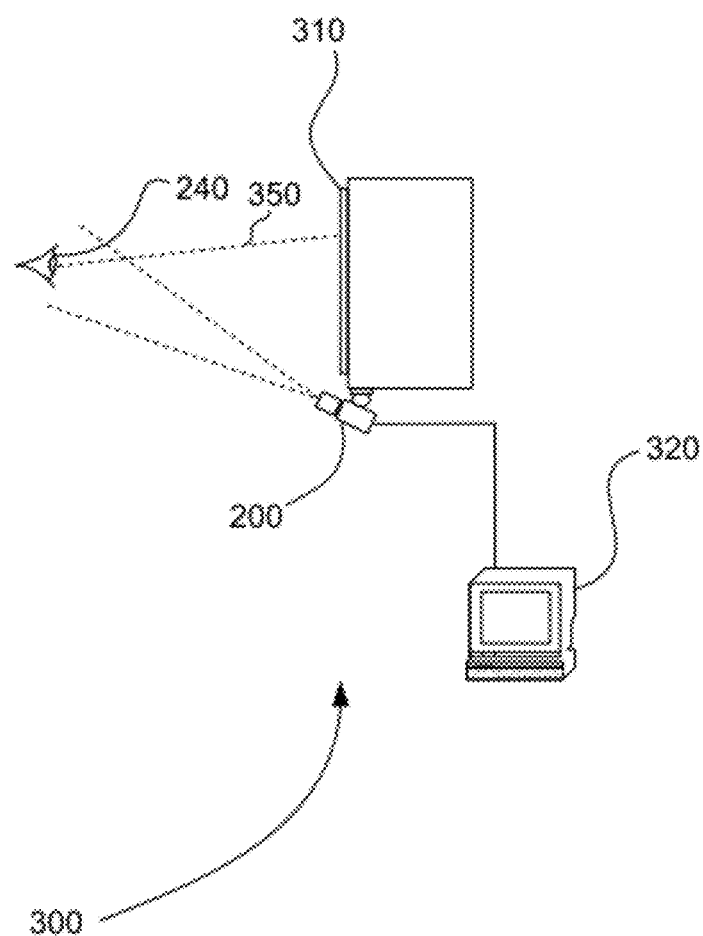
FIG. 3 is a schematic diagram of a system for aiding traffic controllers and/or pilots, in accordance with various embodiments.

FIG. 3 is a schematic diagram of a system 300 for aiding traffic controllers, in accordance with various embodiments. System 300 is used, for example, to aid traffic controllers and/or pilots. System 300 includes display 310, eyetracker 200, and processor 320. Display 310 can include, but is not limited to, a video display that displays a traffic scene, a projector that displays an image on a screen or surface, a computer monitor, a television, a personal viewing device, a head mounted display, or any device capable of rendering images to eye 240 of a user. Display 310 can be a component of eyetracker 200, or display 310 can be a separate device. Display 310 may display indicators of a vehicle's operating parameters, showing the vehicle's conformance or possible lack of conformance to instructions. Examples of possible lack of conformance to instructions may include a situation when two vehicles appear to come within a predetermined distance, according to the collision prediction program. Eyetracker 200 (which may include a video camera) passively tracks the gaze line 350 of an eye 240 of a traffic controller viewing display 310.

When more control is given to a pilot of a plane, a traffic scene surrounding his or her plane may be displayed to the pilot on display 310, and eyetracker 200 passively tracks the gaze line 350 of an eye of the pilot viewing display 310.

Processor 320 can include, but is not limited to, a computer system, a microprocessor, a microcontroller, an application specific integrated circuit (ASIC), a field programmable array (FPGA), or any electronic device capable of executing instructions, storing data, and communicating control and data information. Processor 320 can be a component of eyetracker 200, or processor 320 can be a separate device. Processor 320 is in communication with display 310 and eyetracker 200.

Processor 320 calculates an intersection of gaze line 350 of eye 240 with display 310 and provides continuous feedback to processor 320 as to where on display 310 the traffic controller or pilot is looking. Processor 320 correlates the traffic controller or pilot's gazepoint trace with the various vehicles in the traffic scene and with the indicators of each vehicle's operating parameters.

In embodiments, processor 320 infers the traffic controller or pilot's awareness of a possible vehicle collision between two vehicles by verifying that the traffic controller or pilot has looked at both vehicles in succession or within a given time interval. In other embodiments, processor 320 infers the traffic controller or pilot's awareness of a possible vehicle collision between two vehicles by verifying that the traffic controller or pilot has looked at the indicators of each vehicle's operating parameters.

If processor 320 infers that the traffic controller or pilot has looked at both vehicles in succession or within a given time interval, or has looked at the indicators of each vehicle's operating parameters, processor 320 does not notify the traffic controller or pilot. On the other hand, if processor 320 predicts an increased potential for a collision and a predetermined time period has passed without the traffic controller or pilot visually visiting and revisiting the situation, processor 320 notifies the traffic controller or pilot by, for example, highlighting the two vehicles involved, or drawing arrows to their potential collision point. The notification may automatically disappear as soon as processor 320 determines that the traffic controller or pilot looks at the two vehicles and their projected collision point.

Method for Aiding Traffic Controllers and/or Pilots

Figure 4:
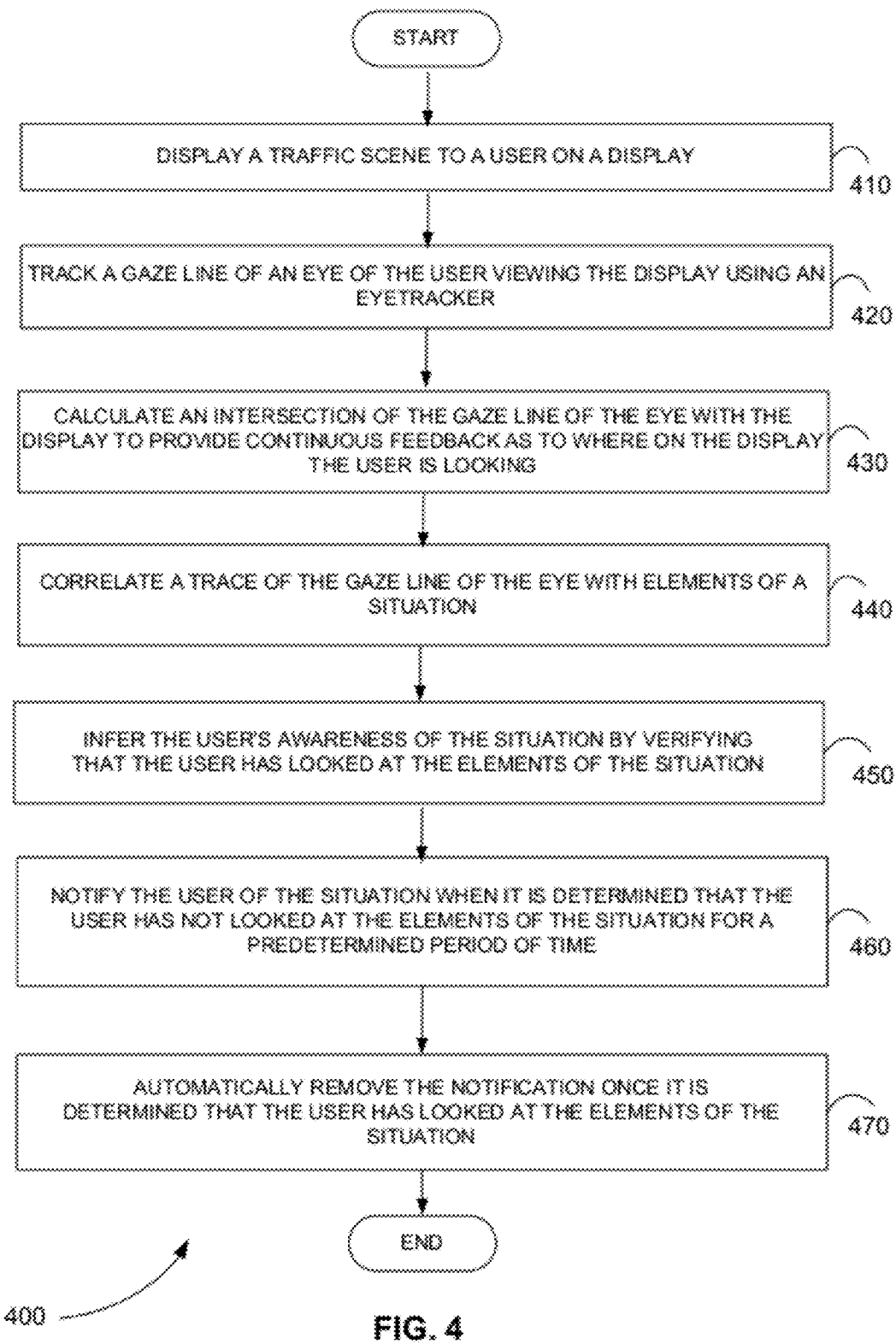
FIG. 4 is flowchart showing a method for aiding traffic controllers and/or pilots, in accordance with various embodiments.

FIG. 4 is flowchart showing a method 400 for aiding traffic controllers and/or pilots, in accordance with various embodiments.

In step 410 of method 400, a traffic scene is displayed to a user on a display.

In step 420, a gaze line of an eye of the user viewing the display is tracked using an eyetracker.

In step 430, an intersection of the gaze line of the eye with the display is calculated to provide continuous feedback as to where on the display the user is looking.

In step 440, a trace of the gaze line of the eye is correlated with elements of a situation.

In step 450, the user's awareness of the situation is inferred by verifying that the user has looked at the elements of the situation.

In step 460, in an embodiment, the user is notified of the situation when it is determined that the user has not looked at the elements of the situation for a predetermined period of time.

In step 470, in an embodiment, the notification is automatically removed once it is determined that the user has looked at the elements of the situation.

Computer Program Product for Aiding Traffic Controllers and/or Pilots

In various embodiments, a computer program product includes a non-transitory and tangible computer-readable storage medium whose contents include a program with instructions being executed on a processor so as to perform a method for aiding traffic controllers and/or pilots. This method is performed by a system that includes one or more distinct software modules.

Figure 5:
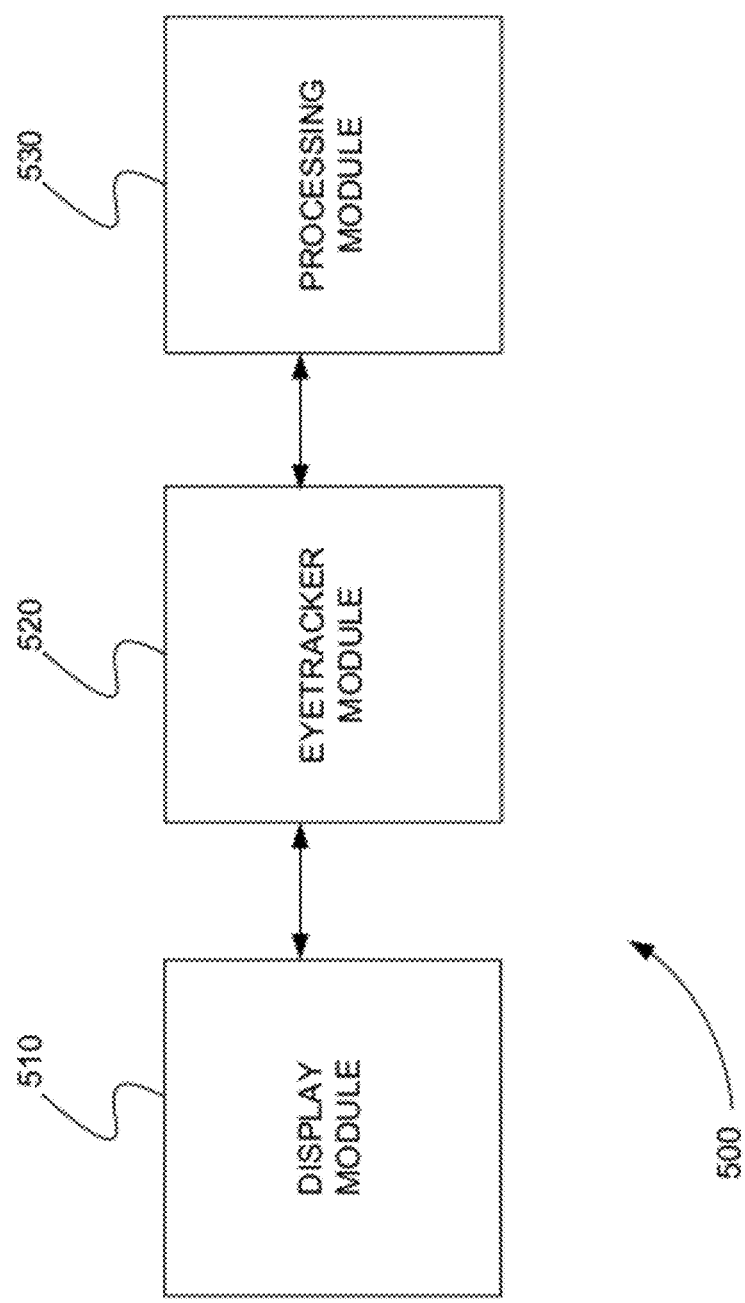
FIG. 5 is a schematic diagram of a system that includes one or more distinct software modules that performs a method for aiding traffic controllers and/or pilots, in accordance with various embodiments.

FIG. 5 is a schematic diagram of a system 500 that includes one or more distinct software modules that performs a method for aiding traffic controllers and/or pilots, in accordance with various embodiments. System 500 includes display module 510, eyetracker module 520, and processing module 530.

Display module 510 displays a traffic scene to a user on a display. Eyetracker module 520 tracks a gaze line of an eye of a user viewing the display. Processing module 530 calculates an intersection of the gaze line of the eye with the display to provide continuous feedback as to where on the display the user is looking Processing module 530 correlates a trace of the gaze line of the eye with elements of a situation. Processing module 530 infers the user's awareness of the situation by verifying that the user has looked at the elements of the situation.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for preventing false positive notifications in an automated collision prediction program using an eyetracker, comprising:
    a display;
    an eyetracker that provides continuous feedback as to where on the display a user is looking; and
    a processor in communication with the display and the eyetracker that
        presents images on the display of a plurality of vehicles and their paths in a traffic scene;
        correlates a trace of the gaze line of the eye with the plurality of vehicles and their paths in the traffic scene;
        infers the user's awareness of a possible collision between two vehicles of the plurality of vehicles in the traffic scene based on their paths by verifying that the user has looked at the two vehicles in succession; and
        does not provide a notification of a possible collision if the user has looked at the two vehicles in succession.

2. The system of claim 1, wherein the possible collision is identified by the automated collision prediction program by determining when two vehicles come within a predetermined distance.

3. The system of claim 1, wherein the eyetracker computes where on the display the user is looking by measuring the gaze line of an eye and calculates the intersection of the gaze line of the eye within the display.

4. The system of claim 1, wherein the processor notifies the user of the possible collision drawing arrows to the two vehicles' potential collision point.

5. The system of claim 4, wherein the processor automatically removes the notification once the processor determines that the user has looked at the possible collision.

6. The system of claim 1, wherein the display is a video display that displays a traffic scene.

7. The system of claim 1, wherein the display is a projector that displays an image on a screen.

8. The system of claim 1, wherein the display is one or more of a computer monitor, a television, a personal viewing device, and a head mounted display.

9. The system of claim 1, wherein the plurality of vehicles comprise ships.

10. The system of claim 1, wherein the plurality of vehicles comprise trains.

11. The system of claim 1, wherein the user is a ship's crewman.

12. The system of claim 1, wherein the processor further infers the user's awareness of the possible collision by verifying that the user has additionally looked at the indicators of operating parameters of each of the two vehicles.

13. The system of claim 1, wherein the indicators of the operating parameters of each of the two vehicles include conformance or lack of conformance to instructions.

14. The system of claim 1, wherein the user is a traffic controller.

15. The system of claim 1, wherein the user is a pilot and the display displays a traffic scene surrounding the pilot's plane.

16. A method for preventing false positive notifications in an automated collision prediction program using an eyetracker, the method being implemented by a computer including a processor, the method comprising:
    displaying a traffic scene to a user on a display;
    providing continuous feedback as to where on the display a user is looking, using an eyetracker;
    presenting images on the display of a plurality of vehicles and their paths in a traffic scene, using the processor;
    correlating, using the processor, a trace of the gaze line of the eye with the plurality of vehicles and their paths in the traffic scene;
    inferring, using the processor, the user's awareness of a possible collision between two vehicles of the plurality of vehicles in the traffic scene based on their paths by verifying that the user has looked at the two vehicles in succession; and
    not providing a notification of a possible collision if the user has looked at the two vehicles in succession.

17. The method of claim 16, wherein the possible collision is identified by the automated collision prediction program by determining when two vehicles come within a predetermined distance.

18. The method of claim 16, wherein the providing continuous feedback step comprises computing where on the display the user is looking by measuring the gaze line of an eye and calculating the intersection of the gaze line of the eye within the display using the eyetracker.

19. The method of claim 16, further comprising notifying the user of the possible collision by drawing arrows to the two vehicles' potential collision point.

20. The method of claim 19, further comprising automatically removing the notification once the processor determines that the user has looked at the elements of the situation.

21. The method of claim 16, wherein the display is one or more of a video display that displays a traffic scene, a projector that displays an image on a screen, a computer monitor, a television, a personal viewing device, and a head mounted display.

22. The method of claim 16, wherein the plurality of vehicles comprise ships.

23. The method of claim 16, wherein the plurality of vehicles comprise trains.

24. The method of claim 16, wherein the user is a ship's crewman.

25. The method of claim 16, wherein the inferring step comprises verifying that the user has additionally looked at the indicators of operating parameters of each of the two vehicles.

26. The method of claim 16, wherein the indicators of the operating parameters of each of the two vehicles include conformance or lack of conformance to instructions.

27. A method for preventing false positive notifications in an automated collision prediction program using an eye-tracker, the method being implemented by a computer including a processor, the method comprising:
- displaying a traffic scene to a user on a display;
- providing continuous feedback as to where on the display a user is looking, using an eyetracker;
- presenting images on the display of a plurality of vehicles and their paths in a traffic scene, using the processor;
- correlating, using the processor, a trace of the gaze line of the eye with the plurality of vehicles and their paths in the traffic scene;
- inferring, using the processor, the user's awareness of a possible collision between two vehicles of the plurality of vehicles in the traffic scene based on their paths by verifying that the user has looked at the two vehicles within a predetermined time interval; and
- not providing a notification of a possible collision if the user has looked at the two vehicles in succession.

\* \* \* \* \*